INVENTORS.
Elmer A. Herider
Kennard Pitts
THEIR ATTORNEYS

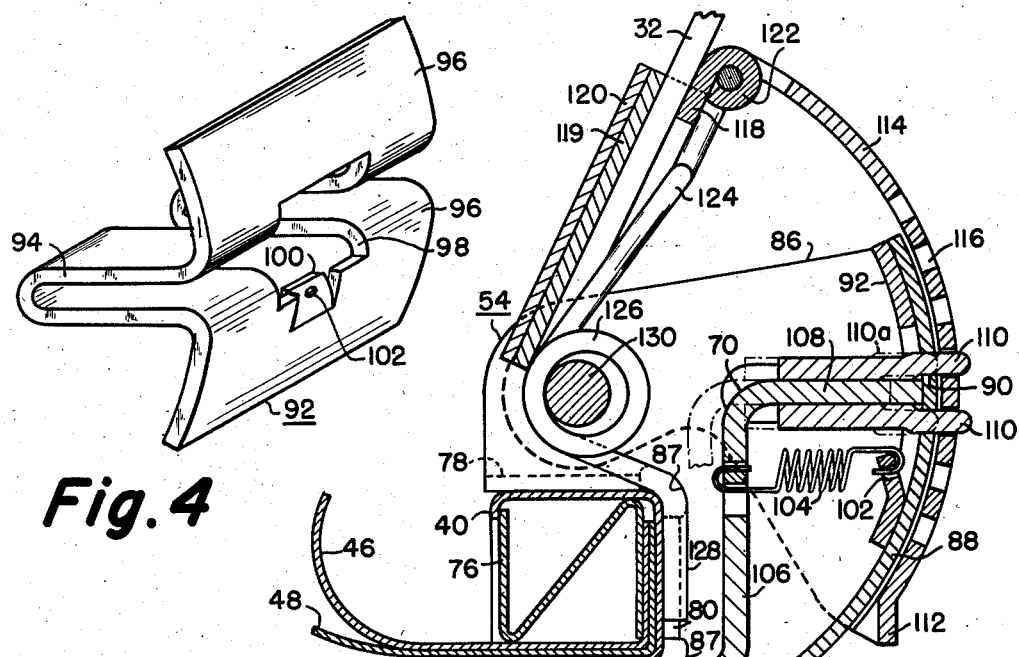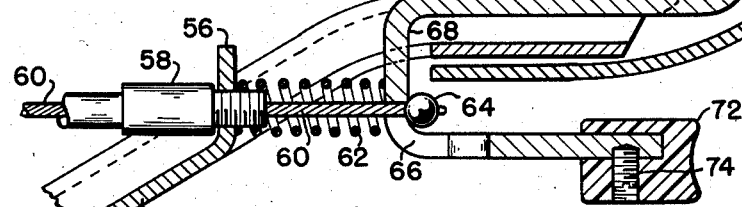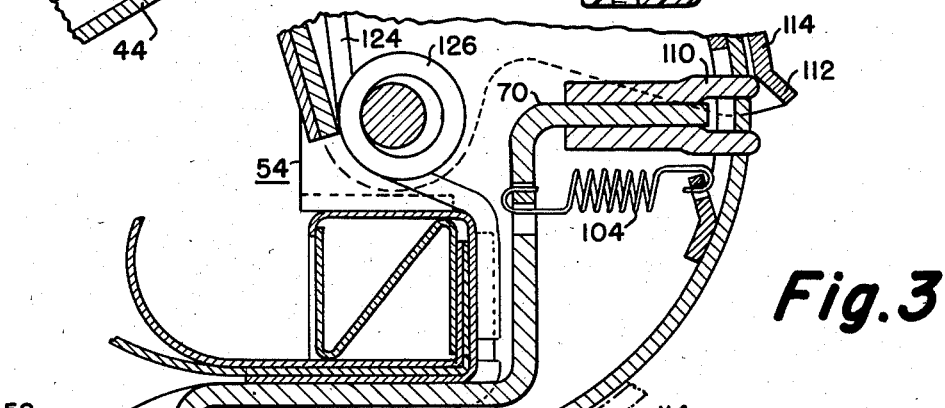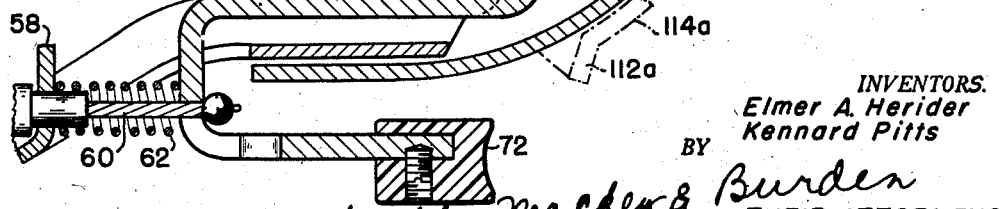

March 25, 1958 E. A. HERIDER ET AL 2,827,951
SEAT LATCHING MECHANISM
Filed Oct. 18, 1955 3 Sheets-Sheet 3

INVENTORS.
Elmer A. Herider
Kennard Pitts
BY Webb, Mackey & Burden
THEIR ATTORNEYS

United States Patent Office 2,827,951
Patented Mar. 25, 1958

2,827,951

SEAT LATCHING MECHANISM

Elmer A. Herider, Dearborn Township, Wayne County, and Kennard Pitts, East Detroit, Mich., assignors to Rockwell Spring and Axle Company, Coraopolis, Pa., a Pennsylvania corporation Application October 18, 1955, Serial No. 541,229

14 Claims. (Cl. 155—160)

This invention relates to latching mechanism for seating structures and, more particularly relates to the latching mechanism for an adjustable folding back rest which is latched thereby in adjusted positions relative to a supporting seat frame in a seating structure.

Folding back rest structure for seats has found wide application in the automotive field and in other fields where the folding of the back rest at will permits use of the seats in spaces in which they would otherwise prove a detriment by partially or completely obstructing the space and preventing free access there past. In automobile bodies for instance, the seat between the front and the rear of the passenger compartment of two-door sedans is desirably provided with a folding back rest to afford a rear occupant access between either side of the rear compartment and the door at that side of the sedan. The added provision of adjustability in the form of a latching mechanism for the folding back rest is also greatly to be desired for the comfort and convenience of the actual occupant of the seat.

It is an object of the present invention to provide a latching mechanism for a folding back rest which will add to the comfort and convenience of the occupant, as noted in the preceding paragraph and which, at the same time, will not prevent or particularly interfere with the folding feature which is provided primarily for the comfort and convenience of the rear occupant.

It is a further object of the present invention to provide a latching mechanism and folding back rest, as defined in the preceding object, wherein a system of dual controls is provided, rendering the latching mechanism operable at the will of the front seat occupant or at the will of an occupant or passenger to the rear of the front seat.

Further features, objects and advantages will either be specifically pointed out or become apparent when, for a better understanding of the invention, reference is made to the following description taken in conjunction with the accompanying drawings in which in general:

Figures 2 and 3 are side elevational views in section of the latching means of Figure 1;

Figure 4 is a perspective view of a V-shaped structural component in the latching means.

Figure 1:
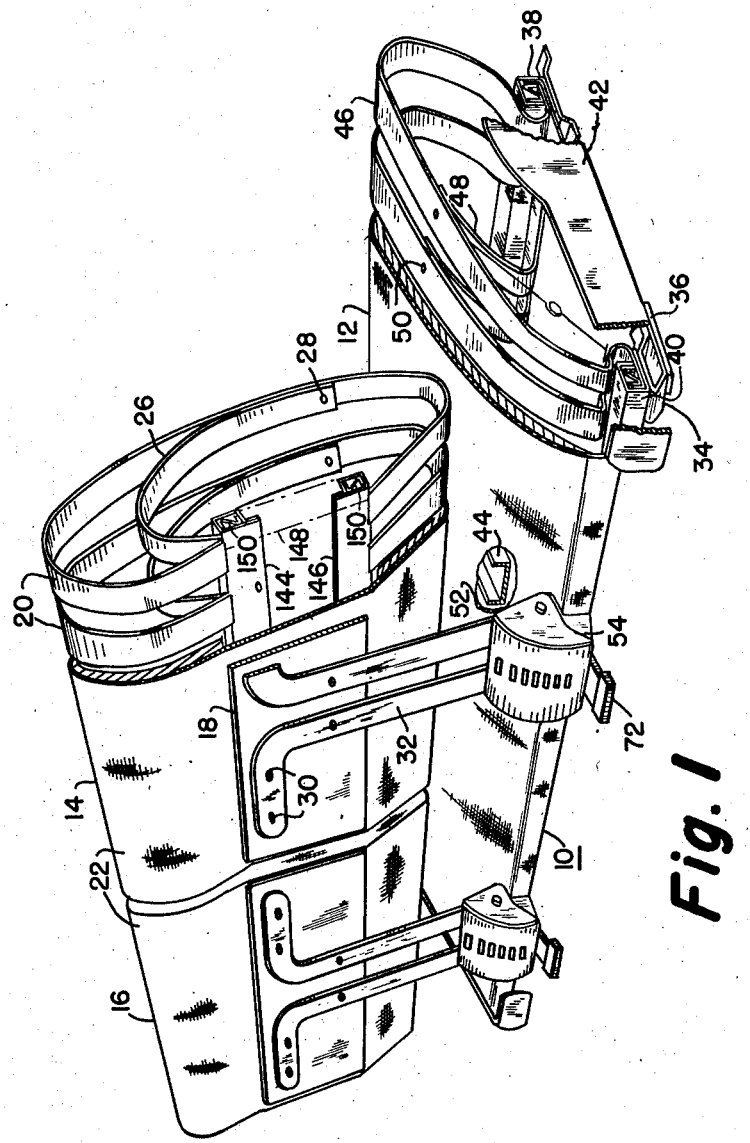
Figure 1 is a perspective view of a seat and back rest structure embodying the presently improved latching means.
Figure 5:
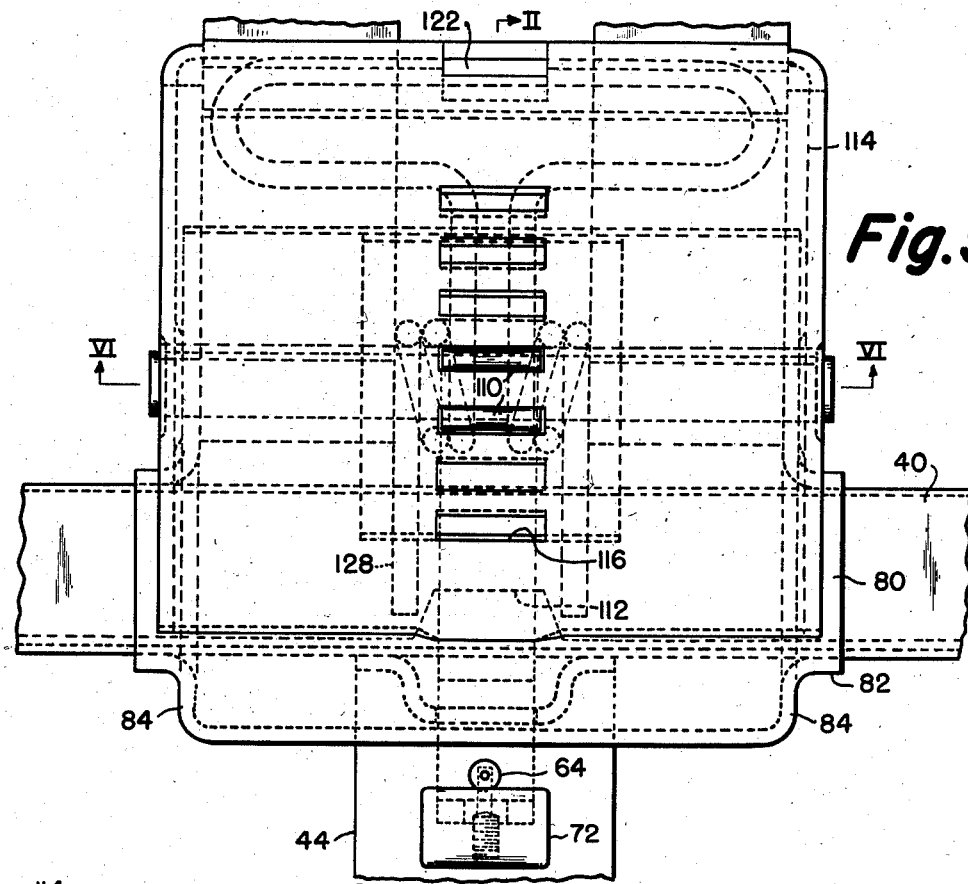
Figures 5 and 6 are rear elevational and plan views of the latching mechanism, the latter view being a section in plan.
Figure 6:
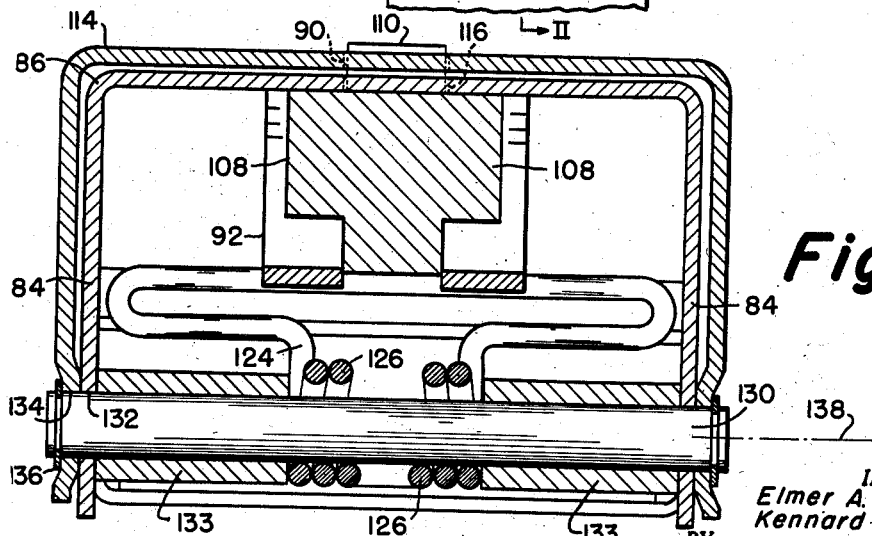

In more particular reference to Figure 1, a seat structure 10 is shown having a full width seat 12 and a split type back providing a pair of similar, separated back rest cushions 14 and 16. In the interests of brevity, only the relatively near back rest cushion in the drawing and its supporting structure will be particularly described in detail. The back structure 14 includes upper and lower retainers 144 and 146 respectively which carry at their front a series of spaced apart flat springs 20 which are arranged side by side and which mutually cooperate to support a padding back rest cover 22. The springs 20 are secured by their opposite ends being inserted into slots provided for them in an upper retainer 144 and a lower retainer 146. The springs 20 are C-shaped and are locked into place by sliding a lock strip 150 through one end of the open box shaped retainers 144 and 146 respectively. The springs form no per se part of the present invention and are more particularly set forth and described in a co-pending patent application Serial No. 541,287, filed Oct. 18, 1955 in the names of Elmer A. Herider et al., the co-inventors herein. In brief however, the C-shaped springs 20 are internally reinforced by means of a flat spring J-shaped member 26 which have a short leg secured to the upper leg of the C-shaped spring 20 by being fastened into the upper retainer 144 along with upper leg of the C-shaped spring 20 and which have a long leg riveted at 28 to an intermediate portion of the body of the C-shaped spring 20. The cover 18 is merely a rectangular shaped board made of Masonite and covered with trim. The screws 30 are used to mount the back frame construction, which consist of an upper retainer 144 and lower retainer 146 and trim edges 148 which are spot welded to the ends of the upper L-shaped upright support arms 32 which are symmetrically disposed to one another in a common plane and extend downward from the plate 18.

The seat 12 is a full width seat particularly adapted for automotive use in two-door sedans, for instance. The supporting structure 10 for the seat is of rectangular shape and has a foot bracket 34 provided at each of the four corners thereof adapted to be suitably secured to the floor pan of the automobile, for instance, by means of longitudinally extending trackways on which the seat structure 10 is adjustably slidable. The brackets 34 support a pair of left and right seat frame side rails, one of which is shown at 36, which are secured to and firmly connect together a pair of front and rear combined spring retainer and seat rails 38, 40. A decorative end shell 42 may be provided at each end of the seat structure 10 so as to conceal the side rails 36.

The front and rear rails 38, 40 are additionally interconnected at intermediate points between the interconnecting side rails by means of a pair of generally longitudinally extending reinforcing channels, one of which is shown at 44. The front and rear rails 38, 40 are adapted to receive the respective front and rear legs of each one of a series of generally C-shaped flat seat cushion springs 46. The seat cushion springs 46 form no per se part of the present invention and are more particularly set forth and described in the noted copending application Serial No. 541,287, filed October 18, 1955, in the names of Elmer A. Herider et al., the co-inventors hereof. In brief, however, the spring steel springs 46 each have an internal J-shaped reinforcing member 48 secured at one end to a corresponding end of the C-shaped spring at the front and secured at the opposite end to a point on or adjacent the midportion of the C-shaped spring as by means of a rivet 50. A covering of padded material 52 is provided on top of the flat springs 46 and extends down the sides of the seat 12.

Each of the back rest structures 14, 16 is pivotally connected for adjusted tilting and for folding movement relative to the seat 12 by means of a dual control latching mechanism 54.

The latching mechanism 54 is more particularly shown in Figures 2, 3, 4, 5, and 6 of the drawings. The intermediate longitudinal member 44 between the front rail and the rear rail 40 is provided with an upstanding tab 56 adjacent its welded juncture with the rear rail and the tab 56 is apertured to carry the threaded end of a Bowden cable release 58. The Bowden cable release 58 includes a pull wire 60 slidable therein and surrounded by means of a coil return spring 62 adjacent one extremity at which it carries a spherically shaped stopper 64.

The stopper 64 is received in a slot 66 formed in the base of a generally U-shaped actuator portion 68 formed on a latching member 70. One leg of the U-shaped actuator portion 68 carries a rectangularly shaped push button 72 which may be formed from a block of plastic and which is secured to the leg by means of a threaded set screw 74 concealed in a cavity within the push button 72. The opposite leg of the U-shaped actuator portion 68 is slidably guided for advancing and retracting limited movement against the underside of the rear rail 40 which may be of a generally square hollow box cross section. The rear legs of the C-shaped flat springs 46 and the U-shaped reinforcing springs 48 are suitably received through slots, not shown, in the hollow box section 40 and are retained therein by means of a Z-shaped retainer rail 76 which is more particularly described and set forth in the noted copending Herider et al. patent application Serial No. 541,287, filed October 18, 1955.

Three sides of the exterior of the hollow box section rail 40 are engaged by a corresponding number of transversely struck flanges 78, 80, and 82 formed at the top, side, and bottom, respectively, and being integral with the opposite end walls 84 of a stationary hinge shell 86. The flanges are separated by arcuately relieved notches 87 in margins of the end walls. The stationary hinge shell 86 is a sheet metal stamping having a cylindrically curved body portion 88 which integrally interconnects the opposite end walls and which is provided with a pair of rectangular spaced apart wall openings formed centrally of the ends thereof at 90. Adjacent and straddling the openings 90, a V-shaped reinforcing member 92 is welded to the inside surface of the body portion 88 and the V-shaped member 92 is more particularly seen in Figure 4. The V-shaped member 92 is a stamping including a reentrant angled body portion 94 which carries a pair of integral outturned mounting flanges 96 for welding engagement with the shell 86. The reentrant angled body portion 94 has an included space or slot extending longitudinally thereof and is formed with a transverse slot 98 through its walls which terminates adjacent the juncture between the mounting flanges 96 and the reentrant angle portion 94. One edge of the slot at 100 may be sheared and deflected outwardly to provide a tab in which a spring anchoring opening 102 is formed. A coil return spring 104 is anchored at one end in the spring anchored opening 102 in the tab and is hooked at the opposite end to an opening in a transverse arm portion 106 in the latching member 70 providing a lateral offset therein between its ends. The offset at 106 permits the latching member 70 to be actuated in a path vertically offset from the principal line of active travel of the latching member in its latching function. The latching member 70 adjacent its latching extremity has a horizontally disposed pair of oppositely directed flat wing portions 108 adapted to be slidably received in the reentrant angle portion 94, Figure 4, of the V-shaped member 92.

A pair of narrow strip plungers 110 is affixed top and bottom as by welding to the latching portion of the latching member 70 and these plungers protrude beyond the end of the former which carries the flat wing portions. Each of the plungers 110 is slidably guided in one of the rectangular openings 90 through the body portion 88 of the hinge shell 86. The plungers 110 are also slidably guided in the transverse slot 98 in the V-shaped member 92 in which they are received so as to prevent any lateral motion of the wings 108 in the longitudinal slot of the reentrant angle portion 94. The upper one of the plungers 110 carried by the latching portion of the latching member 70 is adapted to be engaged by a flanged cam portion 112 formed on a swingable hinge shell 114 which is complementary to and interfits with the stationary hinge shell 86.

The hinge shell 114 is movable from the solid line position of Figure 3 into the dotted line showing 114a, Figure 3, with a swinging motion so as to retract the plungers 110 and the latching member 70 and permit the swinging shell 114 to come into a position at which the plungers 110 will register with two adjacent ones of a row of aligned adjusting openings 116 of rectangular shape formed in the hinge shell body portion which may be cylindrically curved after the same manner as the portion 88 of the stationary shell. The row of aligned openings 116 and the openings 90 in the stationary hinge shell 86 occupy a common vertical plane perpendicular to the axis 138 of the hinge pivot 130. The solid line showing 114 in Figure 3 corresponds to a position of transit of the folding back rest between its folded position and one of its adjusted upright positions according to Figure 2. The body portion of the swingable hinge shell 114 has an upper end flange 118 which is radially inwardly turned and which engages the two L-shaped support arms 32, Figure 2, for the back rest.

The hinge shell 114 has a pair of companion opposite end walls corresponding to the end walls 84 of the stationary hinge shell 86 which are folded over into opposed adjacency with one another at 119 to engage the support arms 32 and are suitably reinforced at their outside face by means of a support plate 120 which may be welded thereto. A tab 122 sheared out of the body portion of the hinge shell 114 adjacent the upper end flange 118 is bent and folded arcuately around the upstanding base of a C-shaped portion of a back rest return spring 124. The opposite legs of the C-shaped portion of the back rest return spring have an integral extension portion depending downwardly toward and connected with a multiple coil midportion 126 of the return spring 124. A pair of depending bent anchoring legs 128 secured to the coil portions 126 abuttingly engages the outside of the box cross section rail 40 so as to form a stop or anchor for the spring 124. A pivot bar 130 passes substantially coaxially through the coil portions 126 of the return spring and is rigidly secured in a pair of spaced apart apertures 132 in the end walls 84 of the stationary hinge shell 86. The extremities of the pivot bar 130 pivotally support a pair of cylindrical eye portions 133 formed by the integral turned ends of the support arms 32 and serve as a pivot for the end walls of the hinge shell 114 and are received through suitable bearing openings 134 provided in the latter. The spaced apart coil midportions 126 of the return spring 124 biasingly separate the support arms 32 in spaced apart relationship. A pair of C-shaped snap ring retainers 136 may be provided to prevent the pivot pin 130 from shifting longitudinally along its own axis indicated at 138.

For an understanding of the operation of the latching device described, let the case be assumed wherein the device initially is operated from the solid line position as shown in Figure 2, in which case the back rest 14 occupies an adjusted position. By means of suitable actuation of the Bowden release cable 58, which is operable by the occupant of the seat from a point to the front of the rear rail 40, or else by means of the rear push button 72, which is operable from the rear of but below the rear rail 40, the latching member 70 is pulled to the left, Figure 2, and the plungers 110 are retracted to the dotted line position 110a in which they are out of engagement with and no longer latch into the registering rectangular openings 116 in the hinge shell 114. The return spring 124 tends to urge the support arms 32 and the back rest 14 into folded position, whereupon the cam surface 112, Figure 3, and the hinge shell 114 swing counterclockwise out of view from Figure 3. Thereupon, the U-shaped actuator portion 68 of the latching member 70 may be released and allowed to resume the normal position of Figure 2, with the hinge shell 114 absent from the immediate vicinity thereof.

Restoration of the back rest from the folded position is accomplished by pressure from the back of the seat occupant which, against the resistance of the back return spring 124, causes the hinge shell 114 to swing clockwise and the cam portion 112 thereof, Figure 3, to come into engagement and depress the plungers 110 moving them to the retracted dotted line position of Figure 2. The plungers 110 under action of the latching member return spring 104 will tend to engage and lock into the first two adjacent holes 116 registering therewith in the body portion of the hinge shell 114. Adjustment of the back rest such that the plungers engage any two other adjacent holes 116 is accomplished merely by appropriate actuation of the Bowden cable release 58 or of the push button 72. Travel of the plungers 110 and the wings of the latching portion of the latching member 70 is appropriately restrained by the V-shaped member 92 in two directions so as to limit their motion of travel to simple rectilinear motion in a short horizontal path between the pivot pin 130 and the cylindrical outer path of motion of the hinge shell 114. In view of the fact that the U-shaped actuator portion 68 is offset by the dimension of the offset 106 from such rectilinear path of travel, it is preferable that the upper leg of the U-shaped portion be slidably engaged with the hollow box section rail 40 so as to prevent canting or twisting action of the latching member 70. Canting or twisting action of the portion of the hollow box section rail 40 in the vicinity of the latching mechanism 54 is prevented due to the strength of the local reinforcement 44 extending rearwardly thereto from the front rail 38, Figure 1.

It is apparent from the foregoing description and discussion that the latching devices 54 are self-enclosed structures owing to their interfitting, swinging and stationary hinge shells and are appropriately actuated either from the rear of the seat, Figure 1, on which they are installed or else from the front thereof so as to be convenient to the seat occupant. The latching means is readily releasable and in no way interferes with the normal tilting function of the seat and is automatically restored to a latched position due to motion of the back rest from its folded position. The cam 112 automatically depresses the plungers 110 such that they are poised for insertion in the first two adjacent openings 116 which register therewith.

Variations within the spirit and scope of the invention described are equally comprehended by the foregoing description.

While we have described certain presently preferred embodiments of our invention, it is to be understood that it may be otherwise embodied within the scope of the following claims.

We claim:

1. In a seating structure, a fixed hollow spring retainer of noncircular cross section, a pair of swingably interconnected shells one of which is connected to the exterior of the spring retainer, said shells having interfitting cylindrically curved body walls and transverse opposite end walls provided with a common pivot pin, openings formed in superposed portions of the body walls of the shells and conforming to a common plane, and retractably mounted latching means receivable in registering openings in the shells to latch them together.

2. In a seating structure, a fixed hollow spring retainer of four-sided cross section forming a seat rail, a back rest, first and second swingably interconnected shells providing a swing connection between the spring retainer and the back rest, said shells having interfitting cylindrically curved body walls and transverse opposite end walls provided with a common pivot pin, openings formed in superposed portions of the body walls of the shells, and latching means shiftably engaged with respect to the seat rail and receivable in registering openings in the shells to lock the same in adjusted positions against swinging movement.

3. A seating structure comprising a hollow spring retainer of noncircular cross section forming a seat rail, a back rest, first and second swingably related shells connected respectively to the seat rail and to the back rest and providing a swing connection therebetween, said shells having interfitting cylindrically curved body walls, openings formed in superposed portions of the body walls of the shells and conforming to a common plane, and latching means retractably mounted to the first shell and receivable in registering openings in the shells to lock the back rest in adjusted positions against swinging movement.

4. In combination, a seat connected shell, a back connected shell, said shells having cylindrically curved interfitting body portions and transverse end walls, hinge pin means connecting the respective end walls of the shells and providing a swinging hinge joint action between the same, retractable latch means having a portion adapted to protrude through an opening in the seat connected shell into reception in advanced position into a registering opening in the back connected shell, and cam means carried by the back connected shell and engageable with said protruding portion on the latch means for temporarily retracting the same out of the path of the back connected shell under the above described hinge joint action.

5. In combination, a first seat connected hinge shell, a second back connected hinge shell, said first and second shells having cylindrically curved interfitting body portions and transverse end walls, a hinge pin connecting the respective end walls of the first and second shells and providing a swinging hinge joint between the same, a seat engaging spring having a midportion intermediate its opposite ends which encircles said hinge pin and having a free end in biasing engagement with said second shell, retractable latch means having a portion adapted to protrude through an opening in the first shell into the path of the second shell for registration in an opening therewithin, and cam means carried by the second shell and engageable with said protruding portion on the latch means for temporarily retracting the same out of the path of the second shell.

6. In a combined hinge and latching structure, a rear seat rail, a stationary hinge shell affixed thereto, a pivot carried by the stationary shell for hingedly supporting a companion hinge shell, a retractable latching member slidably mounted within the stationary shell for limited movement of advancement in a path between the pivot and the companion shell to latch the shells together, said latching member having a U-shaped actuating portion offset from said path of movement, one leg of said U-shaped portion having slidably guided engagement with said seat rail, an actuator button carried by the opposite leg of said U-shaped portion to provide for manual actuation of the latch member from below the seat rail from one side thereof, means connected to the U-shaped portion for actuation of the same from the opposite side of the seat rail.

7. A combined hinge and latching structure comprising a transverse seat rail, a stationary hinge shell affixed thereto, a pivot carried by the stationary shell for hingedly supporting a companion hinge shell, a retractable latching member slidably mounted within the stationary shell for limited advancing movement in a path between the pivot and the companion shell to latch the hinge shells together, said latching member having a U-shaped actuating portion offset from said path of movement, one leg of said U-shaped portion having slidably guided engagement with said transverse seat rail, an actuator button carried by the opposite leg of said U-shaped portion to provide for manipulation of the latching member from below the seat rail from one side thereof, and cable release means at the opposite side of the rail and connected to the base of the U-shaped portion for actuating the latching member.

8. In combination, a back connected shell, a seat connected shell, said shells having cylindrically curved interfitting body portions and containing a common hinge pin cooperating therewith to provide a self-contained hinge joint between the same, and a spring latch constituting the sole means of latching the back to the seat and arranged with a plunger portion common to registering openings through closely spaced body portions of the shells and retractable therewithin to unlatch the shells for relative movement at the joint.

9. In combination, a first hollow hinge shell, a second hollow hinge shell, said first and second shells having cylindrically curved interfitting body portions and transverse end walls, and a hinge pin common to the respective end walls of the first and second shells and providing a swinging hinge joint between the same, said shells containing a spring latch shiftably mounted internally thereof and carrying a portion protruding from their hollow interior at a point mutually received in registering openings in the shells to latch them together.

10. A unitary, predominantly enclosed joint formed of hollow half shell members one within another which present transverse confronting walls at their opposite ends and which concentrically thereof carry a common hinge pin received at each end in registering openings in the shell walls at that end, the outer shell progressively uncovering the inner shell under relative rotation in an opening direction so as to expose increasing amounts of area thereof which for at least a major portion of the movement provides a smooth, continuous surface at the juncture, and biasing means concealed in the hollow interior of said shells for causing relative rotation therebetween in said opening direction.

11. In combination with a pair of closely spaced supports for a back rest, interfitting hollow shell members forming a unitary semi-enclosed joint on which to pivot said supports, said shells presenting transverse confronting walls at their opposite ends and carrying a common hinge pin received at each end in registering openings in the shell walls at that end, said supports having loops at the end which fit said hinge pin at an intermediate portion thereof between the opposite end walls of said shells, said supports and one of said shells being connected for pivotal movement together on said hinge pin.

12. In an enclosed type joint, a shell having spaced transverse end walls joined by a cylindrically curved body, coaxial hinge pin openings at the opposite ends of said shell and each formed in the end wall at that end so as to be concentric with the axis of said curved body portion, said shell adapted to cooperate with a similar shell in forming an enclosed joint between two relatively movable members, flanges for making said shell secure to one of said relatively movable members, and a row of locking apertures formed in said curved body portion in a circumferential path with respect to said axis for locking the members in their positions of relative movement.

13. In an enclosed type joint, a shell having spaced transverse end walls joined by a cylindrically curved body, coaxial hinge pin openings at the opposite ends of said shell and each formed in the end wall at that end so as to be concentric with the axis of said curved body portion, said shell adapted to cooperate with a similar shell in forming an enclosed joint between two relatively movable members, flanges for making said shell secure to one of said relatively movable members, and a reinforcement secured to said cylindrically curved body presenting a reentrant angled portion to guide the side wings of a locking device for said movable members.

14. In an enclosed type joint, a shell having spaced transverse end walls joined by a cylindrically curved body, coaxial hinge pin openings at the opposite ends of said shell and each formed in the end wall at that end so as to be concentric with the axis of said curved body portion, said shell adapted to cooperate with a similar shell in forming an enclosed joint between two relatively movable members, flanges for making said shell secure to one of said relatively movable members, said flanges complementing one another in a non-circular arrangement defining a series of consecutive angles at the included corners so as to conform to a polygonal cross-section of said one member for at least a major portion therearound, thereby preventing the tendency to twist, and a locking device guide reinforcing the body of said shell.

References Cited in the file of this patent

UNITED STATES PATENTS

| | | |
|---|---|---|
| 131,419 | Black | Sept. 17, 1872 |
| 262,311 | Ortlepp | Aug. 8, 1882 |
| 513,735 | Russell | Jan. 30, 1894 |
| 818,081 | Dwyer | Apr. 17, 1906 |
| 998,584 | Martin | July 18, 1911 |
| 1,092,236 | Wrikeman | Apr. 7, 1914 |
| 1,186,294 | Diener | June 6, 1916 |
| 1,846,548 | Ganoung et al. | Feb. 23, 1932 |
| 2,040,942 | Katenkamp | May 19, 1936 |
| 2,122,831 | Atwood et al. | July 5, 1938 |
| 2,312,638 | Gedris | Mar. 2, 1943 |

FOREIGN PATENTS

| | | |
|---|---|---|
| 410,378 | France | Mar. 12, 1910 |